(12) United States Patent
Powell

(10) Patent No.: US 7,939,795 B2
(45) Date of Patent: May 10, 2011

(54) ENCODER DEVICE AND GAPPING AND CENTERING DEVICE FOR AN ENCODER DEVICE

(75) Inventor: Mark Powell, Santa Barbara, CA (US)

(73) Assignee: Heidenhain Corporation, Schaumburg, IL (US)

( * ) Notice: Subject to any disclaimer, the term of this patent is extended or adjusted under 35 U.S.C. 154(b) by 555 days.

(21) Appl. No.: 12/120,178

(22) Filed: May 13, 2008

(65) Prior Publication Data
US 2009/0282947 A1 Nov. 19, 2009

(51) Int. Cl.
G01D 5/34 (2006.01)
H01J 40/14 (2006.01)

(52) U.S. Cl. .................. 250/231.13; 250/239

(58) Field of Classification Search ........ 250/231.13–231.18, 239; 341/13, 341/14; 356/614–622; 359/436, 442; 33/1 N, 33/1 L; 74/813 C; 248/637, 660
See application file for complete search history.

(56) References Cited

U.S. PATENT DOCUMENTS

| 4,512,184 | A | 4/1985 | Ernst et al. |
| 4,794,250 | A | 12/1988 | Togami |
| 4,942,295 | A | 7/1990 | Brunner et al. |
| 5,057,684 | A | 10/1991 | Service |
| 5,708,496 | A | 1/1998 | Barnett et al. |
| 6,452,160 | B1 * | 9/2002 | Mitterreiter ............. 250/231.18 |
| 6,714,292 | B2 | 3/2004 | Mitterreiter |
| 7,601,948 | B1 * | 10/2009 | Setbacken et al. ....... 250/231.13 |
| 2008/0054765 | A1 | 3/2008 | Siraky et al. |

FOREIGN PATENT DOCUMENTS

| EP | 0 557 564 | 9/1993 |
| EP | 1 724 557 | * 11/2006 |
| EP | 1 895 277 | 3/2008 |

* cited by examiner

Primary Examiner — Que T Le
Assistant Examiner — Pascal M Bui-Pho
(74) Attorney, Agent, or Firm — Kenyon & Kenyon LLP (57) ABSTRACT

An encoder device includes: a housing; a hub arranged in the housing, the hub arranged to carry an encoder disk, the hub rotatable in the housing; a cover that is axially movable between a first position and a second position; and a gapping and centering device arranged to urge the hub into a predetermined axial and radial position relative to a portion of the housing when the cover is in the first position, the gapping and centering device arranged to permit axial and radial movement of the hub when the cover is in the second position.

15 Claims, 9 Drawing Sheets

ENCODER DEVICE AND GAPPING AND CENTERING DEVICE FOR AN ENCODER DEVICE

FIELD OF THE INVENTION

The present invention relates to an encoder device and to a gapping and centering device for an encoder device.

BACKGROUND INFORMATION

Encoders are used to measure angular or linear motion. A common use of encoders is for computer numeric control (CNC) machines. In one type of encoder, e.g., a rotary encoder, an encoder disk is rotatable with a shaft of, e.g., a motor, relative to detector electronics that are mounted in a housing of the encoder. In such rotary encoders, it is generally necessary to radially align the encoder disk relative to the shaft so that the rotation axis of the shaft is coaxial to the center of the encoder disk to thereby radially align the rotation axis of the encoder disk relative to the detector electronics. It may also be necessary to gap the encoder disk relative to the detector electronics. That is, it may be necessary to axially align the encoder disk relative to the detector electronics. Such alignment may facilitate installation of the encoder onto the shaft prior to securing the encoder disk to the shaft.

Further, prior to installation onto the shaft, the encoder disk and/or the interior components of the encoder may be damaged due to movement of the encoder disk relative to the housing and associated contact and/or impact between components.

Examples of gapping and centering devices are described, for example, in U.S. Pat. Nos. 5,057,684, 5,708,496, 6,714,292, European Published Patent Application No. 0 557 564, U.S. Pat. Nos. 6,452,160, 4,794,250, 4,942,295, and 4,512,184, each of which is expressly incorporated herein in its entirety by reference thereto. Conventional gapping and centering devices typically require at least two separate parts in addition to the other parts of the encoder device, e.g., the housing and the cover. Many of these devices, for example, those described in U.S. Pat. No. 6,714,292, utilize a radially oriented, or horizontal, slide mechanism.

Minimizing the number of parts may be beneficial to reduce manufacturing costs and to reduce the potential for misassembly.

SUMMARY

According to an example embodiment of the present invention, an encoder device includes: a housing; a hub arranged in the housing, the hub arranged to carry an encoder disk, the hub being rotatable in the housing; a cover that is axially movable between a first position and a second position; and a gapping and centering device arranged to urge the hub into a predetermined axial and radial position relative to a portion of the housing when the cover is in the first position, the gapping and centering device arranged to permit axial and radial movement of the hub when the cover is in the second position.

An axial distance between the hub and the cover may be greater when the cover is in the first position than when the cover is in the second position.

The cover may be held one of the first position and the second position by a detent.

The cover may be locked into its axial position when the cover is in the second position.

The gapping and centering device may include a plurality of clamping elements arranged to urge the hub into a predetermined axial and radial position relative to a portion of the housing when the cover is in the first position, the actuation of the gapping and centering device causing the clamping elements to move radially outwardly, thereby removing the clamping force applied to the hub.

Each of the clamping elements may be mounted on at least one spring arm configured to exert a radially directed force onto the respective clamping element.

The at least one spring arm may be arranged so as to apply a radially outwardly directed force on the respective clamping element when the cover is in the first position.

The at least one spring arm may be arranged so as to apply a radially inwardly directed force on the respective clamping element when the cover is in the second position.

Each clamping element may have at least one projection that extends radially inwardly into a circumferential groove of the hub when the cover is in the first position.

The interface between the at least one projection and the hub may be V-shaped.

Each of the clamping elements may have an actuation member arranged so as to slidably communicate with the cover, thereby such that axial movement of the cover is thereby translated into radial movement of the clamping elements.

The cover may have at least one wedge-shaped axial extension, where the wedge-shaped axial extension may be arranged so as to slidably communicate with the actuation member when the cover is moved from the first position to the second position so as to pull the respective clamping element radially away from the hub.

The cover may further include a pushing member, where the pushing member may be arranged to contact the actuation member when the cover is in the first position, thereby pressing the clamping element against the hub.

The actuation member may have at least one lateral projection, the lateral projection extending in a tangential direction with relation to the hub, at least one of (a) the axial extension and (b) the pushing member arranged so as to transmit force to the lateral projection when the cover is moved from the first position to the second position.

Each of (a) the cover and (b) the gapping and centering device may be integrally formed as a single piece.

The gapping and centering device may be integrally formed with the housing as a single piece.

According to an example embodiment of the present invention, an encoder device includes: a housing; a hub arranged in the housing, the hub arranged to carry an encoder disk, the hub having an axis and being rotatable in the housing; and a cover that is axially movable between a first position and a second position, the cover in the first position arranged to urge the hub into a predetermined axial and radial position relative to a portion of the housing, the cover in the second position arranged to permit axial and radial movement of the hub.

The encoder device may also include a gapping and centering device arranged to apply a clamping force to the hub when the cover is in the first position, where the gapping and centering device may be actuatable by moving the cover from the first position to the second position, thereby removing the clamping force.

Further features and aspects of example embodiments of the present invention are described in more detail below with reference to the appended Figures.

DETAILED DESCRIPTION

Figure 1:
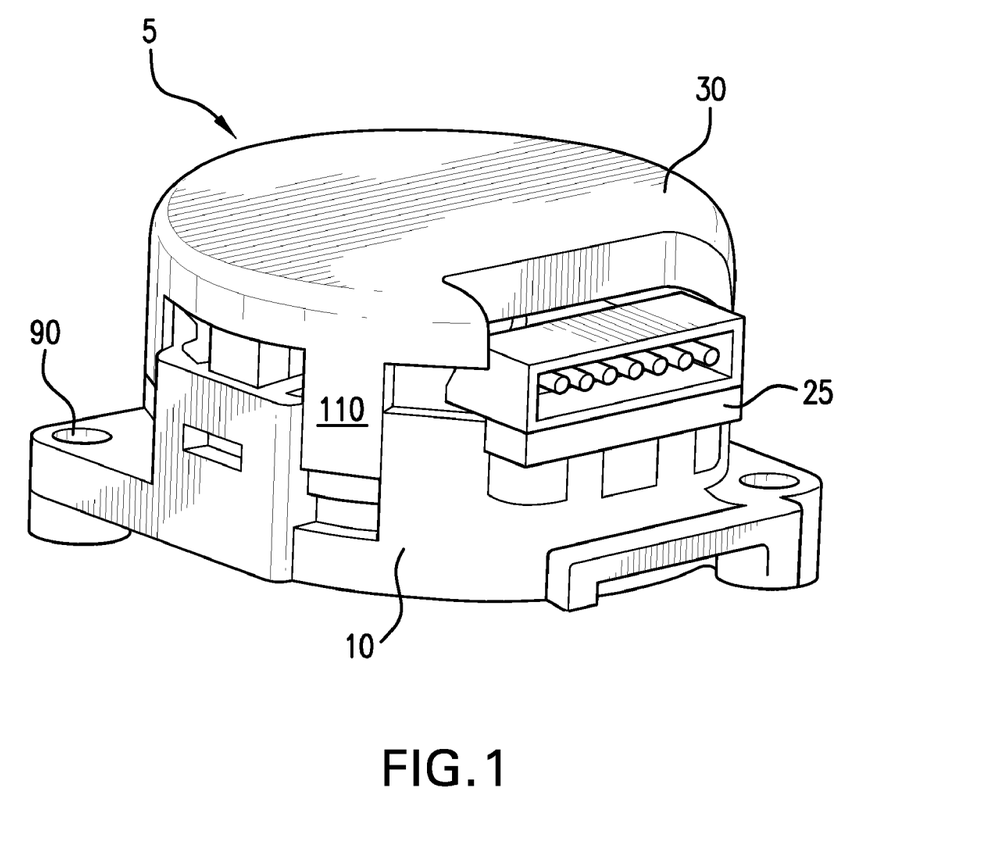
FIG. 1 is a perspective view of an encoder according to an exemplary embodiment of the present invention illustrating a cover in a first position.
Figure 2:
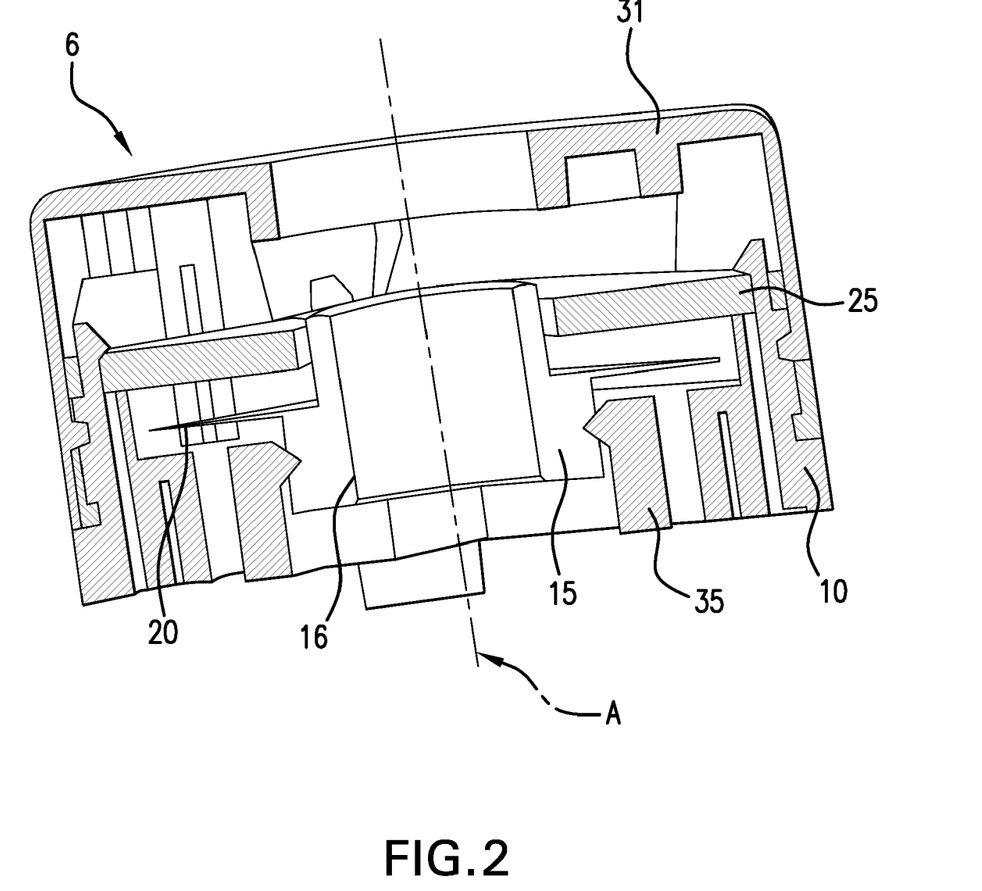
FIG. 2 is a cross-sectional view of an encoder according to an exemplary embodiment of the present invention illustrating a cover in a first position.

As indicated above, FIG. 1 is a perspective view of an encoder 5 according to an exemplary embodiment of the present invention illustrating a cover 30 in a first position. FIG. 2 is a cross-sectional view of an encoder 6 according to an exemplary embodiment of the present invention illustrating a cover 31 in a first position. The encoder 5 illustrated in FIG. 1 differs from the encoder 6 illustrated in FIG. 2 in that the cover 30 of encoder 5 has a solid upper surface, whereas the cover 31 of encoder 6 has a through hole in the upper surface. Otherwise, the encoders 5 and 6 include analogous features. Referring to each of FIGS. 1 and 2, the cover 30 or 31 is attached to a housing 10. A hub 15 having an internal bore 16 and an axis A is arranged in the housing. The hub 15 is arranged so as to be mountable onto a rotating shaft, e.g., a motor shaft. The hub 15 carries an encoder disk 20, which may be of any appropriate type, e.g., a slotted or reflective disk for optical encoding. The housing 10 also supports encoder electronics 25 including, e.g., photodiode detectors. Rotation of the hub about the axis A causes the encoder disk 20 to rotate within a plane perpendicular to the axis A. When the hub 15 is mounted to a rotatable shaft, the axis A also corresponds to an axis of rotation of the rotatable shaft. The encoder also includes a gapping and centering device 35 that urges the hub into a predetermined axial and radial position relative to a portion of the housing 10 when the cover 30 or 31 is in the first position as illustrated in, e.g., FIGS. 1 and 2. The gapping and centering device 35 as shown also resists rotation of the hub by frictional forces between the gapping and centering device 35 and the hub 15. However, according to other examples, the hub 15 may be more freely rotatable or may be prevented from rotating by a positive stop when engaged by the gapping and centering device. Further, although the gapping and centering device is integrally formed, e.g., by injection molding, with the housing 10 as a single piece, according to other examples, the gapping and centering device may be formed as a separate component that is coupled to the housing.

Figure 5:
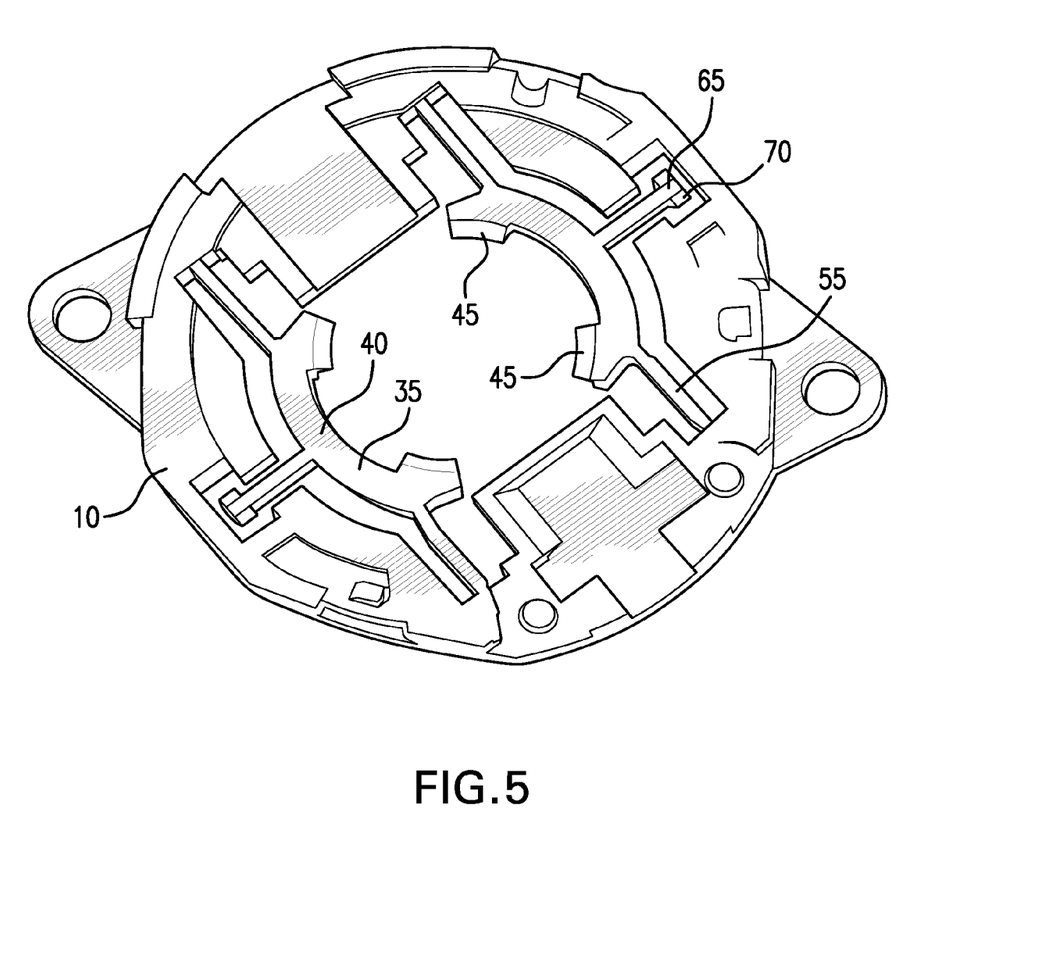
FIG. 5 is a top view of a housing and a gapping and centering device of the encoder illustrated in FIG. 2.

The gapping and centering device 35 includes, referring to FIG. 5, two opposed clamping elements 40. Although the gapping and centering device 35 has two clamping elements, it should be appreciated that any number of clamping elements, including a solitary clamping element, may be provided. Each clamping element has a pair of projections 45 that are arranged, as shown, e.g., in FIGS. 2 and 8, to engage the hub 15 at a circumferential groove 50, the projections 45 extending into the groove 50 so as to form a V-shaped interface therebetween. The extension of the projections 45 into the groove 50 urges the hub into its predefined axial position. The presence of the projections 45 at multiple locations around the hub 15 urges the hub into its predefined radial position. The gapping and centering device 35 applies a clamping force to the hub 15 via the projections 45 pushing radially inwardly onto the hub 15. Although the clamping force may be provided, it is not necessarily required, as the V-shaped interface may maintain the axial and radial position of the hub without a clamping force. In this regard, it should be appreciated that other interface geometries may be provided, e.g., semicircular, square, and/or polygonal, etc., and/or the geometry of the projections need not be complementary, i.e., need not match, the geometry of the groove. It should be further appreciated that multiple, axially spaced-apart circumferential grooves may be provided. According to certain example embodiments, the groove may not extend around the entire periphery of the hub and may be intermittent, e.g., a plurality of grooves along a circumferential line. Moreover, according to certain example embodiments, the hub 15 may not have a groove. In this arrangement, the gapping and centering device may maintain the radial position by applying clamping forces, and may maintain the axial position due to frictional forces between the gapping and centering mechanism and the outer surface of the hub. Although the gapping and centering mechanism 35 has a projection that extends into a groove 50 of the hub 15, it should be appreciated that the hub may have a projection that is received by a groove in the gapping and centering device.

Referring to FIG. 5, the clamping elements 40 are each attached to the housing 10 by a pair of support or spring arms 55. The spring arms 55 bias the clamping elements 40 into the rest position as shown. As such, spring arms 55 exert a radially outwardly directed force on the clamping elements 40 when the clamping elements 40 are moved radially inwardly from the rest position, whereas the spring arms 55 exert a radially inwardly directed force on the clamping elements 40 when the clamping elements 40 are moved radially outwardly from the rest position. Although the spring arms 55 permit motion in the radial direction, they substantially restrict motion of the clamping elements 40 in the axial direction. This resistance to axial motion is achieved in part by the axial height of the spring arms. The mounting of the clamping elements 40 in this manner allows the clamping elements 40 to move radially inwardly and/or outwardly while maintaining axial rigidity. Each of the clamping elements 40 includes an actuation member 65 that extends radially outwardly to a portion of the actuation member 65 having two lateral projections 70. The lateral projections extend in opposite tangential directions.

Figure 6:
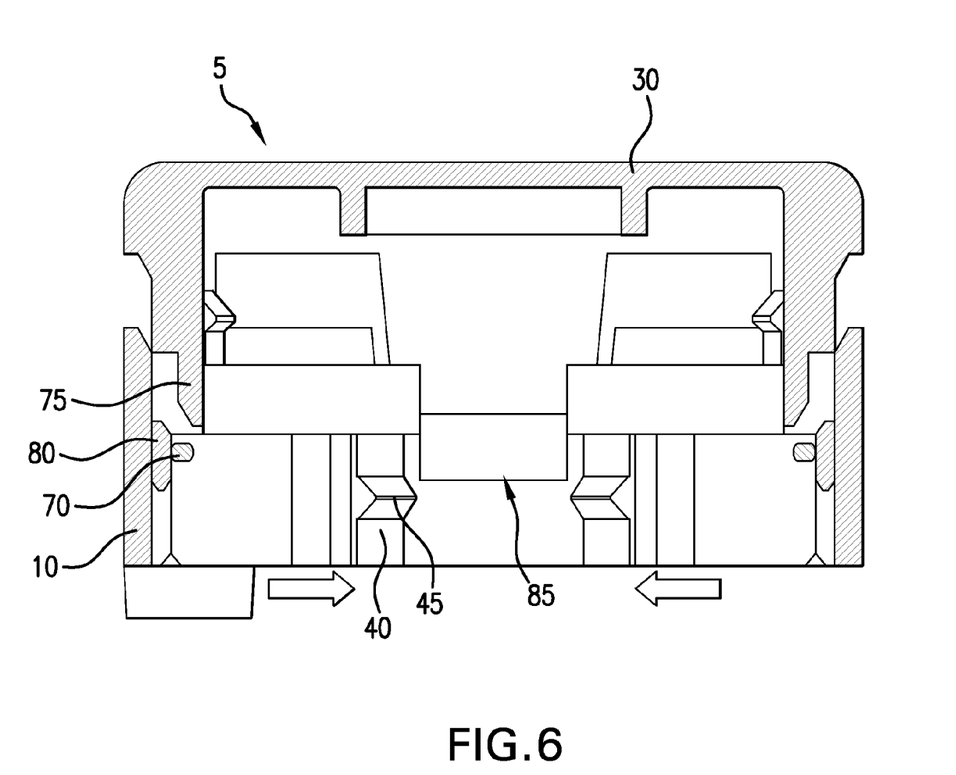
FIG. 6 is a cross-sectional view of the encoder illustrated in FIG. 1 illustrating an interface between a gapping and centering device and the cover in the first position.
Figure 7:
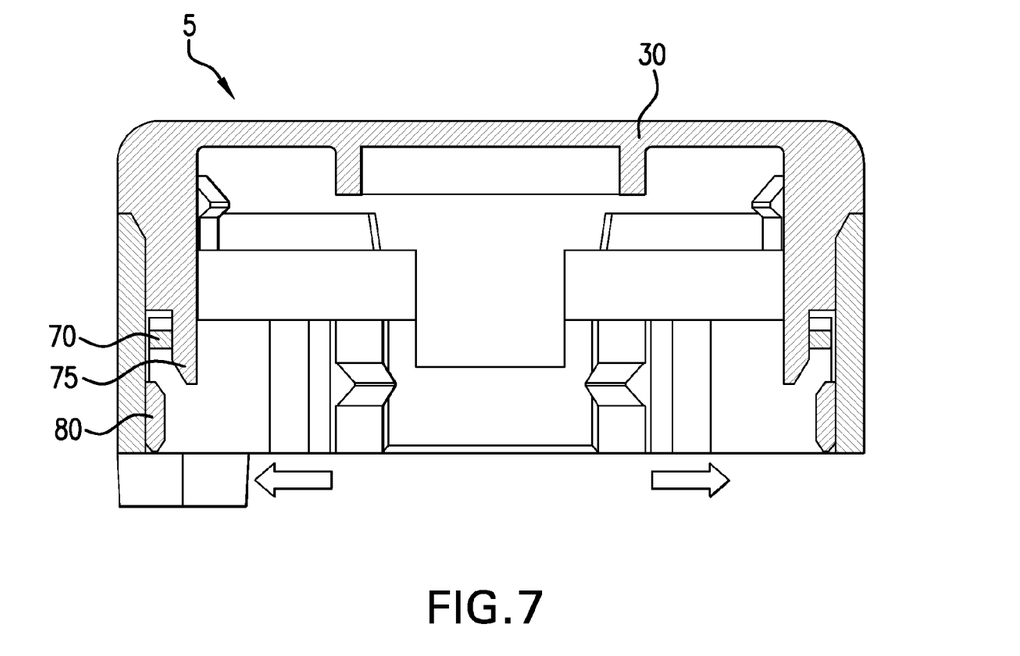
FIG. 7 is a cross-sectional view of the encoder illustrated in FIG. 1 illustrating an interface between the gapping and centering device and the cover in the second position.

Referring to FIGS. 6 and 7, the cover 30 includes a wedge-shaped axial extension 75 and a pushing member 80. When the cover is in the first position, illustrated in FIG. 6, the pushing members 80 are in contact with the lateral projections 70, thereby providing a hard, or positive, stop against radially outward motion of the lateral projections 70, and therefore of clamping elements 40. In this manner, the pushing members 80 maintain the position of the clamping elements 40 such that the projections 45 extend into the circumferential groove 50 of the hub 15, as shown, for example, in FIGS. 2 and 8, thus urging the hub 15 into its predefined axial and radial position. The encoder may be dimensioned such that the clamping members apply a clamping force onto the hub 15, the clamping force maintained by the pushing members 80 contacting the lateral projections 70. When the cover 30 is in the first position shown in FIG. 6 an aperture 85 is formed between the cover 30 and the housing 10, such that access is provided to the hub 15. In this manner, a tool, for example, an Allen wrench, may extend into an interior space of the encoder to access a set screw of the hub to secure the hub to a rotating shaft.

Figure 3:
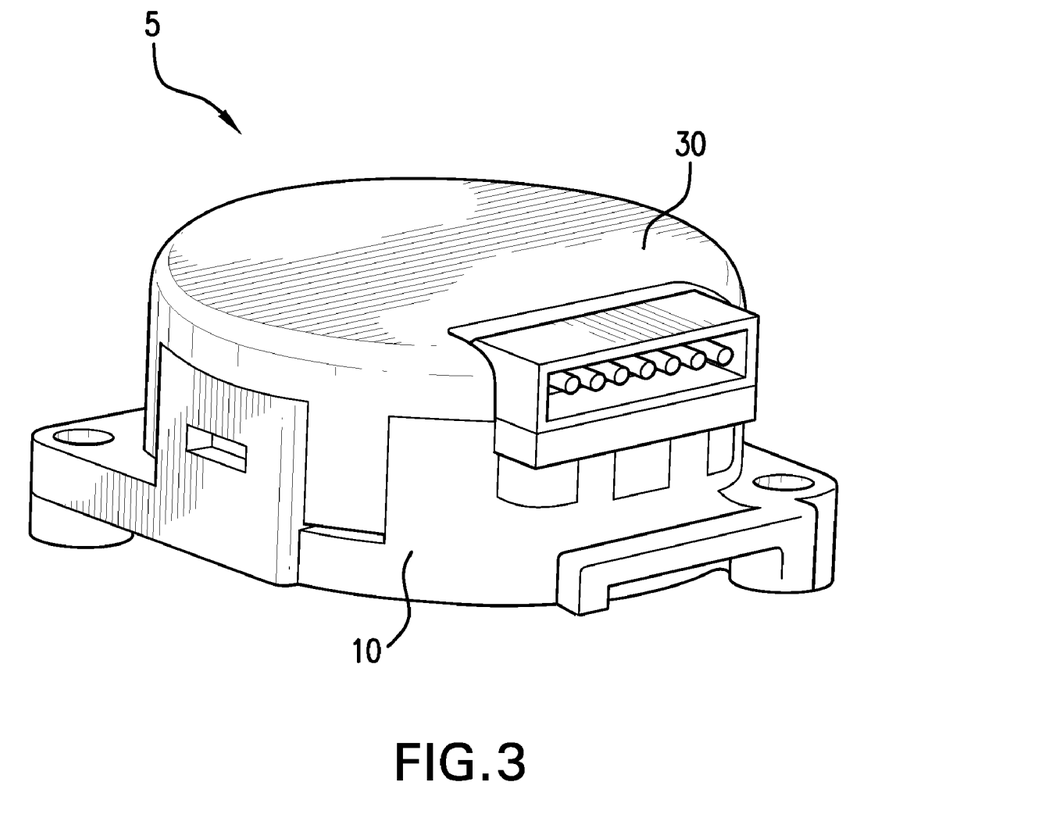
FIG. 3 is a perspective view of the encoder illustrated in FIG. 1 illustrating the cover in a second position.

When the cover 30 is pushed axially downwardly toward the housing 10, the pushing members 80 slide axially downwardly below the lateral projections 70 of the clamping elements, as shown in FIG. 7. In this manner, the clamping elements are allowed to, or are urged to, move radially outwardly from the hub. As the cover is pushed downwardly, the wedge-shaped axial extension 75 comes into sliding communication of with the lateral projections 70 of the clamping elements 40. The slanted surface of the extension 75 gradually pushes the lateral projections 70 radially outwardly, such that the clamping elements 40 are pulled radially outwardly away from the hub. In this manner, the axial extension 75 functions as a linear cam with the lateral projections 70 acting as cam followers, thereby translating the axial motion of the cover into radial motion of the clamping elements. It should be appreciated that the cover may have a slot, e.g., a continuous slot, that receives the lateral projections, thereby continually guiding the clamping elements from the radially inward position to the radially outward position as the cover is moved from the first position to the second position, as shown, for example, in FIG. 3.

Figure 8:
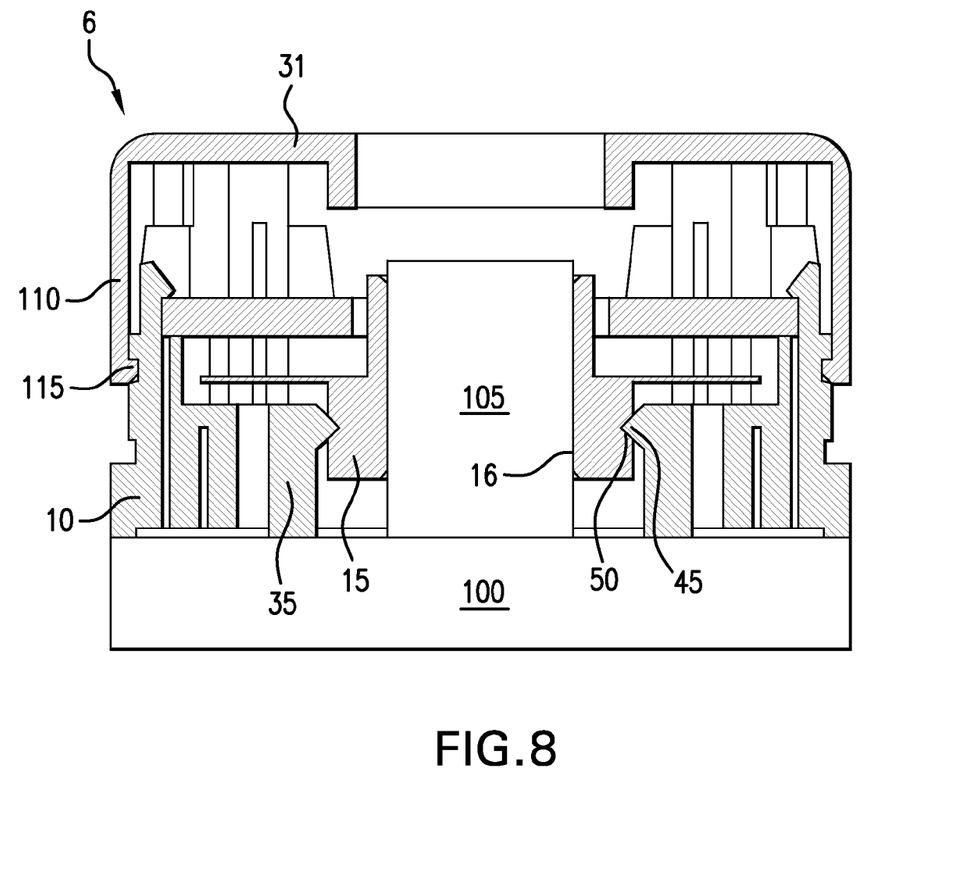
FIG. 8 is a cross-sectional view of the encoder illustrated in FIG. 2 illustrating an outer interface between a housing and the cover in the first position.
Figure 9:
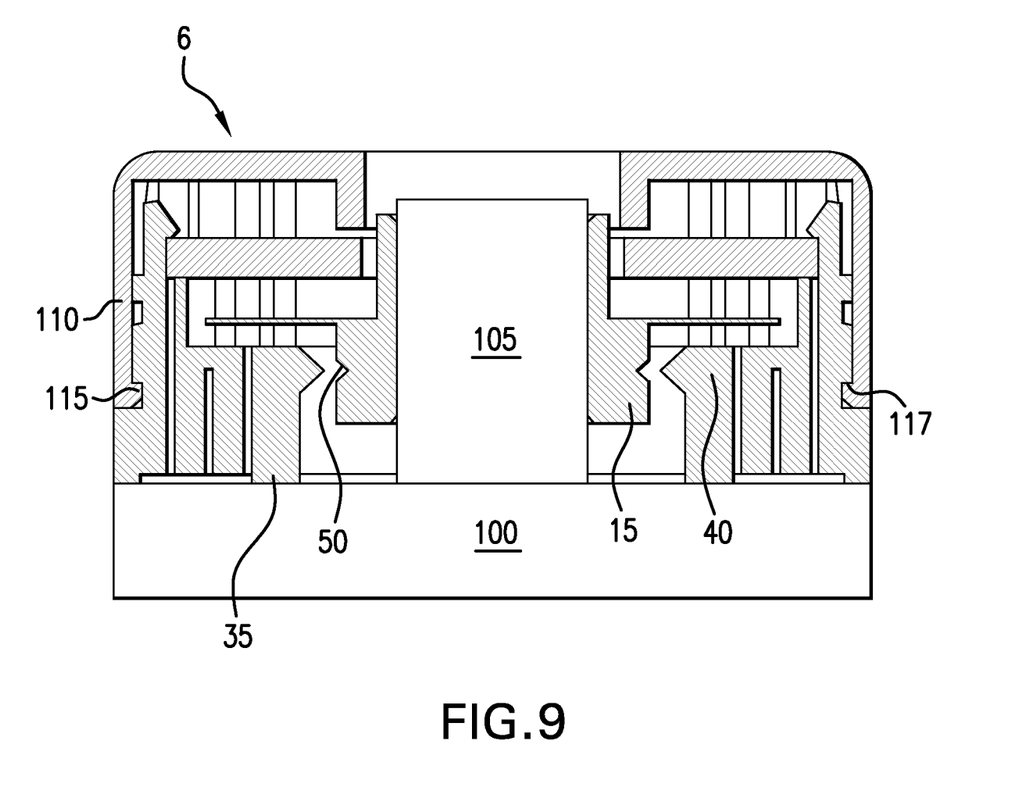
FIG. 9 is a cross-sectional view of the encoder illustrated in FIG. 2 illustrating an outer interface between the housing and the cover in the second position.

An encoder may be arranged as shown in FIGS. 1, 2, 6, and 8, with the cover in the first position, prior to installation onto a rotatable shaft of, e.g., an electric motor. The encoder may then be mounted onto a motor housing, e.g., a housing of an electric motor, by any appropriate arrangement, e.g., by securing fasteners through mounting flanges 90, shown in FIG. 1. Installation of the encoder on the motor housing is facilitated in that the hub 15 is urged into its predetermined axial and radial position, thus allowing the hub 15 to easily receive the rotating shaft of the motor. As shown in FIG. 8, the encoder 6 is installed onto the housing of a motor 100 such that a rotating shaft 105 of the motor 100 extends through the internal bore 16 of the hub 15. At this point, the hub may be secured to the rotating shaft by, e.g., tightening a set screw or set screws of the hub 15. The hub is then fully supported by its attachment to the shaft 105, thus eliminating the need for the gapping and centering device 35 to urge the hub into the predetermined axial and radial position. Thus, the cover may be pressed axially downwardly, into the second position as shown in FIG. 9, thereby drawing the clamping elements 40 out of the circumferential groove 50 and radially outwardly away from the hub 15. This arrangement constitutes a final installed arrangement of the encoder 6.

Although the first position of the cover, i.e., the position in which the gapping and centering device urges the hub into the predetermined radial and axial position, is axially farther away from the housing than the second position, i.e., the position in which the gapping and centering device is drawn away from the hub, it should be appreciated that the cover may be axially closer to the encoder housing when in the first position than in the second position.

Referring, for example, to FIGS. 1 and 8, the cover is attached to the housing 10 by a plurality of connection extensions 110 that extend along an outer portion of the housing 10. Each of the connection extensions 110 has a snap element 115 that engages with the housing 10 to form a detent that releasably holds the cover in the first position as shown. Upon application of sufficient axially downwardly directed force onto the cover to overcome the detent, the cover slides axially downwardly into the second position as shown, for example, in FIGS. 4 and 9. In the second position, the snap element 115 engages the housing 10 to snap the cover into place, thus forming a latch 117 to secure the cover in the second position. Although the snap element 115 is arranged to resist axially upward movement of the cover away from the first position, it should be appreciated that the snap element may engage the housing when the cover is in the second position so as to form a detent that is easily overcome. This may be achieved by, e.g., applying a sufficient chamfer to the axially upwardly directed portion of the snap element and/or the axially downwardly directed portion of the housing in the region of the latching interface 117. Moreover, it should be further appreciated that, although the snap element 115 is a male component that engages with corresponding female geometry of the housing, the housing may have male geometry, e.g., protrusions, that engage with female geometry of the cover. Although the covers shown have four connection extensions, it should be appreciated that any number of connection extensions may be provided, including a single connection extension that extends around the entire periphery or circumference of the cover.

The housing 10 is integrally formed as a single piece, including the mounting flanges and the gapping and centering device 35 (including, e.g., the clamping elements 40, spring arms 55, projections 45, actuation member 65, and/or lateral projections 70, etc.). However, it should be appreciated that the housing may be formed separately from at least some of the other components, e.g., the gapping and centering mechanism. The cover 30, 31 is integrally formed as a single piece including the wedge-shaped axial extensions 75 and the pushing members 80. However, at least some of the components of the cover may be formed as separate pieces.

Figure 4:
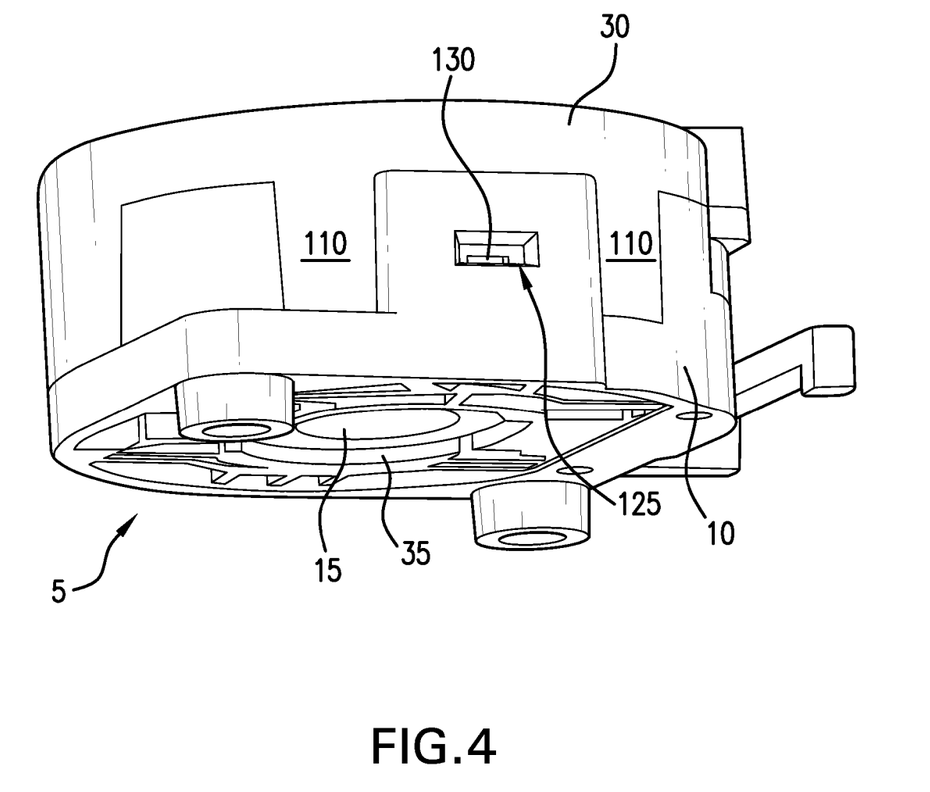
FIG. 4 is a perspective view illustrating the underside of the encoder illustrated in FIG. 3.

As shown, for example, in FIG. 4, the housing 10 has an aperture 125 that allows access, e.g., by a screwdriver, to an inner portion of the housing. This aperture thus allows access to a slot 130 in the cover which may be pried axially upwardly, e.g., by a flat head screwdriver. This may allow the cover to be removed in situations where the encoder needs to be replaced or serviced, or where it is desired to attach the encoder to another motor. To remove the encoder, the cover would first be urged upwardly by, e.g., prying using the slot in the cover through the aperture 125. The cover would then be slid axially upwardly into the first position, whereby the gapping and centering device 35 again urges the hub 15 into its predefined axial and radial position. The hub is then loosened from the rotating shaft by disengaging the set screw(s) through the aperture 85. In this regard, the shaft may need to be rotated to align the set screw(s) with the aperture. Once the hub is loosened from the shaft, the housing 10 may be disconnected from the motor housing, e.g., by removing the fasteners through the mounting flanges 90. The encoder may then be removed by sliding the encoder axially upwardly until the rotating shaft clears the bore 16 of the hub.

Although the present invention has been described with reference to particular examples and exemplary embodiments, it should be understood that the foregoing description is in no manner limiting. Moreover, the features described herein may be used in any combination.

What is claimed is:
1. An encoder device, comprising:
a housing;
a hub rotatably arranged in the housing and arranged to carry an encoder disk;
a cover that is axially movable between a first position and a second position; and a gapping and centering device arranged to urge the hub into a predetermined axial and radial position relative to a portion of the housing when the cover is in the first position, the gapping and centering device arranged to permit axial and radial movement of the hub when the cover is in the second position;

wherein the cover is locked into its axial position when the cover is in the second position.

2. The encoder device according to claim 1, wherein an axial distance between the hub and the cover is greater when the cover is in the first position than when the cover is in the second position.

3. The encoder device according to claim 1, wherein the cover is held in one of the first position and the second position by a detent.

4. The encoder device according to claim 1, wherein the gapping and centering device includes a plurality of clamping elements arranged to urge the hub into a predetermined axial and radial position relative to a portion of the housing when the cover is in the first position, the actuation of the gapping and centering device causing the clamping elements to move radially outwardly to remove the clamping force applied to the hub.

5. The encoder device according to claim 4, wherein each of the clamping elements is mounted on at least one spring arm configured to exert a radially directed force onto the respective clamping element.

6. The encoder device according to claim 4, wherein each clamping element includes at least one projection that extends radially inwardly into a circumferential groove of the hub when the cover is in the first position.

7. The encoder device according to claim 6, wherein an interface between the at least one projection and the hub is V-shaped.

8. The encoder device according to claim 1, wherein the cover is integrally formed as a single piece, and the gapping and centering device is integrally formed as a single piece.

9. An encoder device, comprising:
a housing;
a hub rotatably arranged in the housing and arranged to carry an encoder disk:
a cover that is axially movable between a first position and a second position; and
a gapping and centering device arranged to urge the hub into a predetermined axial and radial position relative to a portion of the housing when the cover is in the first position, the gapping and centering device arranged to permit axial and radial movement of the hub when the cover is in the second position;
wherein the gapping and centering device includes a plurality of clamping elements arranged to urge the hub into a predetermined axial and radial position relative to a portion of the housing when the cover is in a first position, the actuation of the gapping and centering device causing the clamping elements to move radially outwardly to remove the clamping force applied to the hub;
wherein each of the clamping elements is mounted on at least one spring arm configured to exert a radially directed force onto the respective clamping element; and
wherein the spring arm is arranged to apply a radially outwardly directed force on the respective clamping element when the cover is in the first position.

10. The encoder device according to claim 9, wherein the spring arm is arranged to apply a radially inwardly directed force on the respective clamping element when the cover is in the second position.

11. An encoder device, comprising:
a housing;
a hub rotatably arranged in the housing and arranged to carry an encoder disk:
a cover that is axially movable between a first position and a second position; and
a gapping and centering device arranged to urge the hub into a predetermined axial and radial position relative to a portion of the housing when the cover is in the first position, the gapping and centering device arranged to permit axial and radial movement of the hub when the cover is in the second position;
wherein the gapping and centering device includes a plurality of clamping elements arranged to urge the hub into a predetermined axial and radial position relative to a portion of the housing when the cover is in the first position, the actuation of the gapping and centering device causing the clamping elements to move radially outwardly to remove the clamping force applied to the hub; and
wherein each of the clamping elements has an actuation member arranged to slidably communicate with the cover to translate axial movement of the cover into radial movement of the clamping elements.

12. An encoder device, comprising:
a housing;
a hub rotatably arranged in the housing and arranged to carry an encoder disk:
a cover that is axially movable between a first position and a second position; and
a gapping and centering device arranged to urge the hub into a predetermined axial and radial position relative to a portion of the housing when the cover is in the first position, the gapping and centering device arranged to permit axial and radial movement of the hub when the cover is in the second position;
wherein the gapping and centering device includes a plurality of clamping elements arranged to urge the hub into a predetermined axial and radial position relative to a portion of the housing when the cover is in the first position, the actuation of the gapping and centering device causing the clamping elements to move radially outwardly to remove the clamping force applied to the hub;
wherein each clamping element includes least one prosection that extends radially inwardly into a circumferential groove of the hub when the cover is in the first position;
wherein an interface between the at least one projection and the hub is V- shaped; and
wherein the cover has at least one wedge-shaped axial extension, the wedge- shaped axial extension arranged to slidably communicate with the an actuation member when the cover is moved from the first position to the second position so as to pull the respective clamping element radially away from the hub.

13. The encoder device according to claim 12, wherein the cover includes a pushing member arranged to contact the actuation member when the cover is in the first position to press the clamping element against the hub.

14. The encoder device according to claim 13, wherein the actuation member has at least one lateral projection extending in a tangential direction with relation to the hub, at least one of (a) the axial extension and (b) the pushing member arranged to transmit force to the lateral projection when the cover is moved from the first position to the second position.

15. An encoder device, comprising:
   a housing;
   a hub rotatably arranged in the housing and arranged to carry an encoder disk:
   a cover that is axially movable between a first position and a second position; and
   a gapping and centering device arranged to urge the hub into a predetermined axial and radial position relative to a portion of the housing when the cover is in the first position, the gapping and centering device arranged to permit axial and radial movement of the hub when the cover is in the second position;
   wherein the cover is integrally formed as a single piece;
   wherein the gapping and centering device is integrally formed as a single piece; and
   wherein the gapping and centering device is integrally formed with the housing as a single piece.

* * * * *